United States Patent [19]
Farian et al.

[11] 3,787,977
[45] Jan. 29, 1974

[54] DENTAL HANDPIECE OF STRAIGHT OR ANGLE TYPE

[75] Inventors: Gerhard Farian; Willi Fink, both of Biberach/Riss, Germany

[73] Assignee: Kaltenbach & Voigt, Biberach/Riss, Germany

[22] Filed: Mar. 25, 1971

[21] Appl. No.: 128,035

[52] U.S. Cl. .................................................. 32/27
[51] Int. Cl. ............................................. A61c 1/10
[58] Field of Search.......................308/DIG. 5; 416/503; 418/179; 417/DIG. 1; 32/26, 27

[56] References Cited
UNITED STATES PATENTS

| | | | |
|---|---|---|---|
| 3,465,442 | 9/1969 | Baldwin et al. | 32/27 |
| 3,622,254 | 6/1969 | LeBlanc, Jr. | 418/179 |

FOREIGN PATENTS OR APPLICATIONS

| | | | |
|---|---|---|---|
| 606,541 | 8/1948 | Great Britain | 308/DIG. 5 |
| 437,052 | 10/1935 | Great Britain | 308/DIG. 5 |

*Primary Examiner*—Robert Peshock
*Attorney, Agent, or Firm*—Waters, Roditi, Schwartz & Nissen

[57] ABSTRACT

A bearing in a dental handpiece comprises a thin inner sleeve press-fitted in a thicker outer sleeve. The outer sleeve is porous and the inner sleeve impermeable, the inner sleeve having an axial groove with radial apertures leading from the groove to the outer surface of the inner sleeve to serve as channels for flow of lubricant from the outer sleeve to the inner surface of the inner sleeve.

10 Claims, 3 Drawing Figures

PATENTED JAN 29 1974 3,787,977

DENTAL HANDPIECE OF STRAIGHT OR ANGLE TYPE

BACKGROUND OF THE INVENTION

1. Field of the Invention

The invention relates to a dental handpiece of straight or angle type in the interior of which a driving shaft is mounted by means of a plain bearing in the form of a sleeve.

2. Description of the Prior Art

Hitherto bearing sleeves consisting of rolled or drawn metal, e.g. steel or bronze, have been used for plain bearings in dental handpieces of straight or angle type. Such bearings are suitable for relatively low rotational speeds. In the case of high rotational speeds of the order of 100,000 revolutions per minute, considerable heat is produced whereby rapid wear occurs. Thus such plain bearings are not suitable for dental handpieces of straight or angle type having rotational speeds in the range of 100,000 revolutions per minute.

German Patent No. 897,778 shows bearings which comprise two sleeves arranged concentrically with respect to one another and connected securely to one another, the outer sleeve having a thicker wall and being constituted of large-pored sintered metal while the relatively thinner walled inner sleeve is constituted of fine-pored metal. This known arrangement, however, it not suitable for high rotational speeds such as 100,000 revolutions per minute due to the roughness of the inner wall of the inner sleeve, since the aforesaid roughness gives rise to poor sliding properties, which result in considerable friction and thus a great amount of heat and rapid wear.

German patent No. 702,938 shows a similar bearing wherein the outer sleeve is formed with an annular space provided by two interconnected half hollow rings which are approximately U-shaped in cross-section, the space being filled with a lubricating wick material. The inner sleeve consists of a cast member, formed for example, of bronze. Through the inner sleeve there extend radial apertures which open into the annular space of the outer sleeve. The construction is expensive, and is technically complicated due to the presence of four components i.e. the two half hollow rings, the lubricating wick material and the inner sleeve. Moreover, this bearing is not suitable for dental handpieces of straight and angle type which are usually of a diameter in the region of 10 mm, since on the one hand the bearing must be of substantial size due to the complicated construction, and on the other hand the inner sleeve is heated to such an extent when high rotational speeds are used, of the order of 100,000 revolutions per minute, that rapid wear occurs. In addition, the radial apertures may become fouled and blocked since they are in direct contact with the rotating shaft.

French patent No. 1,471,780 shows a bearing which consists of two sleeves abutting one another, an annular space being provided in the plane of abutment for receiving a sintered metal ring, there being axial recesses leading into said space in order to form a lubricant supply chamber. The sintered metal ring comprises radially inwardly directed projections which extend through corresponding radial ducts emanating from the annular space to a position flush with the inner wall of the bearing. Apart from the complicated construction, the different manufacture of the sintered metal ring with its projections and the difficult fitting procedure, satisfactory lubrication is not possible at the aforesaid high rotational speeds since the pores of the sintered metal projections rapidly become closed due to smearing as a result of direct communication between the projections and the rotating shaft, which causes rapid wear.

Finally, German utility model 1,985,176 shows a plain bearing which consists of a metal sleeve with inner, through, axial lubricating grooves which are provided with radial communicating passages leading to an oil supply chamber. Due to the necessary oil circulation with its consequent sealing problems, this arrangement requires a relatively great deal of space and therefore large sizes and is not suitable for use in a dental handpiece of straight or angle type which, of course, is of small size.

SUMMARY OF THE INVENTION

An object of the invention is to provide a straight or angle dental handpiece of the type mentioned above whose plain bearing has the necessary simplicity and construction and smallness of size for use in dental straight or angle handpieces and does not involve any objectional heating at high rotational speeds of the order of 100,000 revolutions per minute, and thus is subjected to substantially no wear.

To satisfy this objective, according to the invention it is proposed that the plain bearing be constructed in a manner known per se of two concentrically arranged sleeves connected securely to one another, the outer sleeve having a larger wall thickness than the inner sleeve, the outer sleeve being constituted of sintered metal and the inner sleeve of rolled and/or drawn sealing-tight metal with a smooth surface, such as copper-beryllium, the inner sleeve being provided with at least one inner axial groove, and from the bottom of the axial groove extend radial apertures which open at the inner wall of the outer sleeve.

The outer sleeve can be made of sintered steel or sintered bronze.

It has been found that the plain bearing of the straight or angle dental handpiece according to the invention, consisting only of two parts and of simple construction, with its very small bearing dimensions withstands very high loads per unit of surface area without occurrence of the aforesaid disadvantages. The proposed inner sleeve in co-operation with the empty radial apertures emanating from the bottom of the axial groove reliably prevent objectionable heating, the axial groove with the radial apertures preventing blocking and ensuring a satisfactory circulation of lubricant making abrasion impossible. Due to the axial groove with the radial apertures opening at the inner wall of the outer sleeve, good lubrication with an adequate oil supply is guaranteed even at rotational speeds of 100,000 revolutions per minute, the outer sleeve of sintered metal constituting an adequate oil supply chamber. The greater wall thickness of the outer sleeve relative to the wall thickness of the inner sleeve, the greater the oil supply formed by the outer sleeve.

Good bearing capacity is guaranteed by the smooth, hard running surface of the inner sleeve in conjunction with the driving shaft of the handpiece constituted of still harder material.

BRIEF DESCRIPTION OF THE DRAWING

One embodiment of the invention is shown in the drawing wherein.

DETAILED DESCRIPTION

Figure 1:
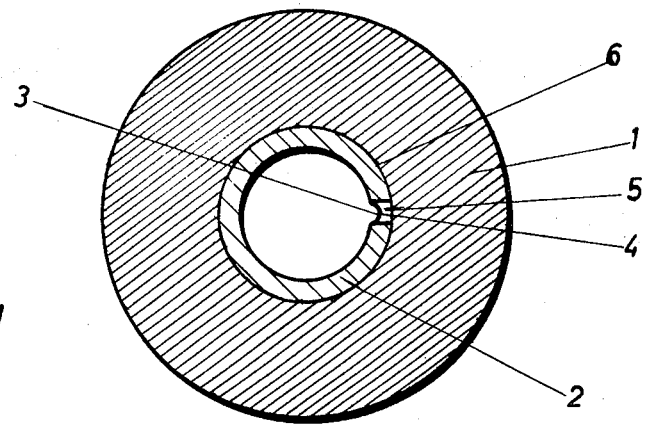
FIG. 1 is a radial sectional view showing a plain bearing of a straight or angle dental handpiece.
Figures 2, 3:
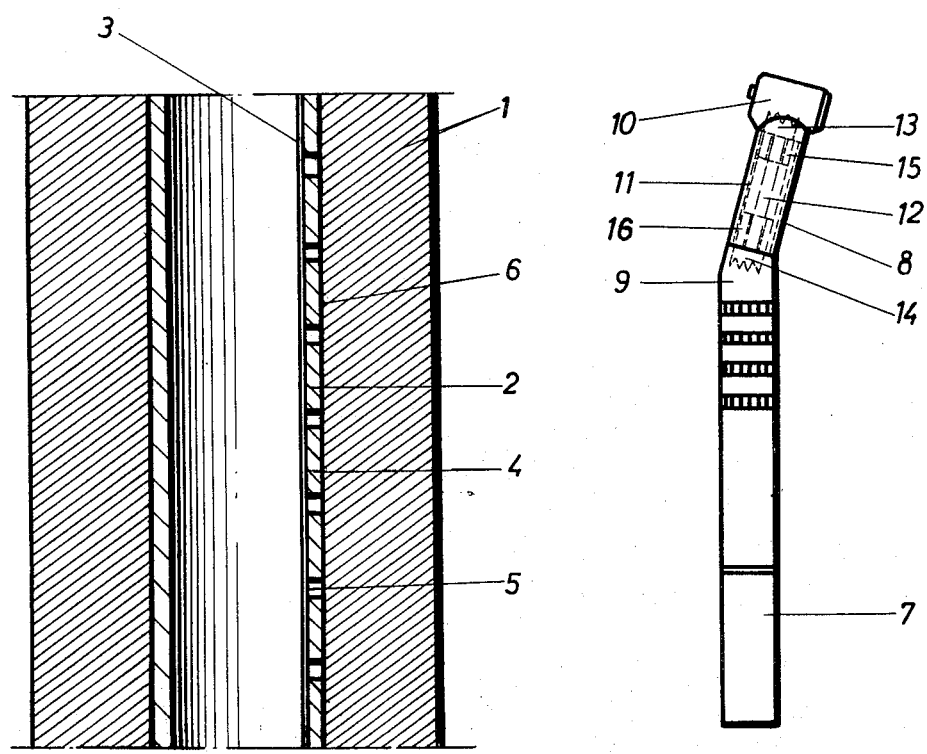
FIG. 2 shows the plain bearing of FIG. 1 in axial section.
FIG. 3 is a side view of an angle handpiece with a shank elbow, in which the plain bearing shown in FIGS. 1 and 2 can be used as shown in broken lines.

Referring to FIGS. 1 and 2 of the drawing, therein is shown a plain bearing for a dental handpiece which consists of two concentrically arranged sleeves 1 and 2 securely connected to one another such as by press fitting. The outer sleeve 1 is made of sintered metal and hence is porous. The outer sleeve has a greater wall thickness than the inner sleeve. The thin-walled inner sleeve 2 is pressed into sleeve 1. Sleeve 2 is not formed of sintered metal and instead is constituted of rolled and/or drawn, impervious metal with a smooth surface, such as a copper-beryllium alloy. The inner sleeve 2 is provided with an inner axial groove 3 at the bottom 4 of which there extend radial apertures 5 which open at the inner wall 6 of the outer sleeve 1.

The illustrated plain bearing can be directly arranged and secured, as for example by a press fit, in the handle sleeve 7 of a straight or angle dental handpiece. The sleeve 1 is in communication with a supply of lubricant and due to the porosity of sleeve 1 it absorbs the lubricant and serves as a lubricant supply for sleeve 2. The sleeve 2 receives lubricant on its inner surface via apertures 5 and groove 3 which serve as a channel means for flow of lubricant to the inner surface of sleeve 2.

A further use is shown in FIG. 3 and consists of two plain bearings 15, 16 secured in a special housing sleeve 11 in spaced relation from one another, the sleeve 11 itself being secured in the intermediate sleeve 8 between elbow 9 and head 10 of the angle dental handpiece with the shank elbow.

In this case, the two plain bearings 15, 16 serve to support an intermediate shaft 12 which at each of its two ends carries respective toothed wheels 13, 14 engaging corresponding tooth wheels of respective connecting shafts. Such straight or angle handpieces are currently operated at rotational speeds of the order of 100,000 revolutions per minute, and the above constructions are particularly advantageous.

What is claimed is:

1. A dental handpiece comprising a high speed rotational shaft, and a plain bearing with lubricant circulation for said shaft, said bearing comprising two concentric sleeves securely connected to one another in tight fitting relation, the outer sleeve having a greater wall thickness than the inner sleeve, the outer sleeve being porous and supplied with lubricant to form a reservoir thereof, the inner sleeve being impervious to said lubricant and having a smooth inner surface in which the shaft rotates, the inner sleeve being provided with at least one inner axial groove and radial apertures extending from said groove and opening at the exterior of the inner sleeve to face the inner surface of the outer sleeve to conduct lubricant to the groove via said apertures, whereby the lubricant is supplied between the shaft and the inner surface of the inner sleeve.

2. A handpiece as claimed in claim 1 wherein said sleeves are cylindrical and coextensive in length.

3. A handpiece as claimed in claim 2 wherein the apertures extend in uniform spaced axial arrangement along the inner sleeve.

4. A handpiece as claimed in claim 1 comprising an elbow, an angled portion extending from said elbow and having a free end and a head on said free end of the angled portion, said shaft being disposed in said angled portion and having opposite ends, one of said bearings supporting said shaft at each of the ends thereof in said angled portion.

5. A handpiece as claimed in claim 4 comprising a toothed wheel on each of said shaft.

6. A handpiece as claimed in claim 1 wherein said outer sleeve is constituted of sintered metal. 1

7. A handpiece as claimed in claim 6 wherein the inner sleeve is a copper-beryllium alloy.

8. A handpiece as claimed in claim 7 wherein the inner sleeve is press fit in said outer sleeve.

9. A handpiece as claimed in claim 8 wherein said inner sleeve is drawn.

10. A handpiece as claimed in claim 8 wherein said inner sleeve is rolled.

* * * * *